Figure 5:
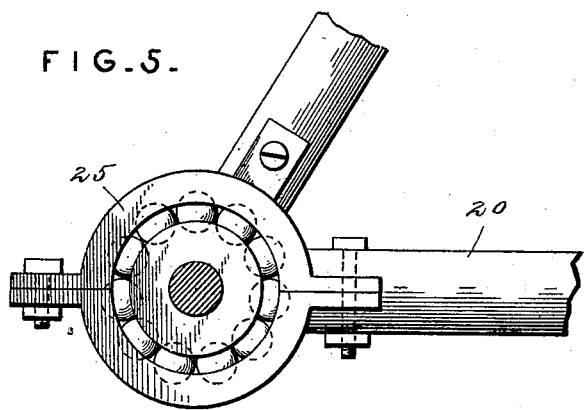

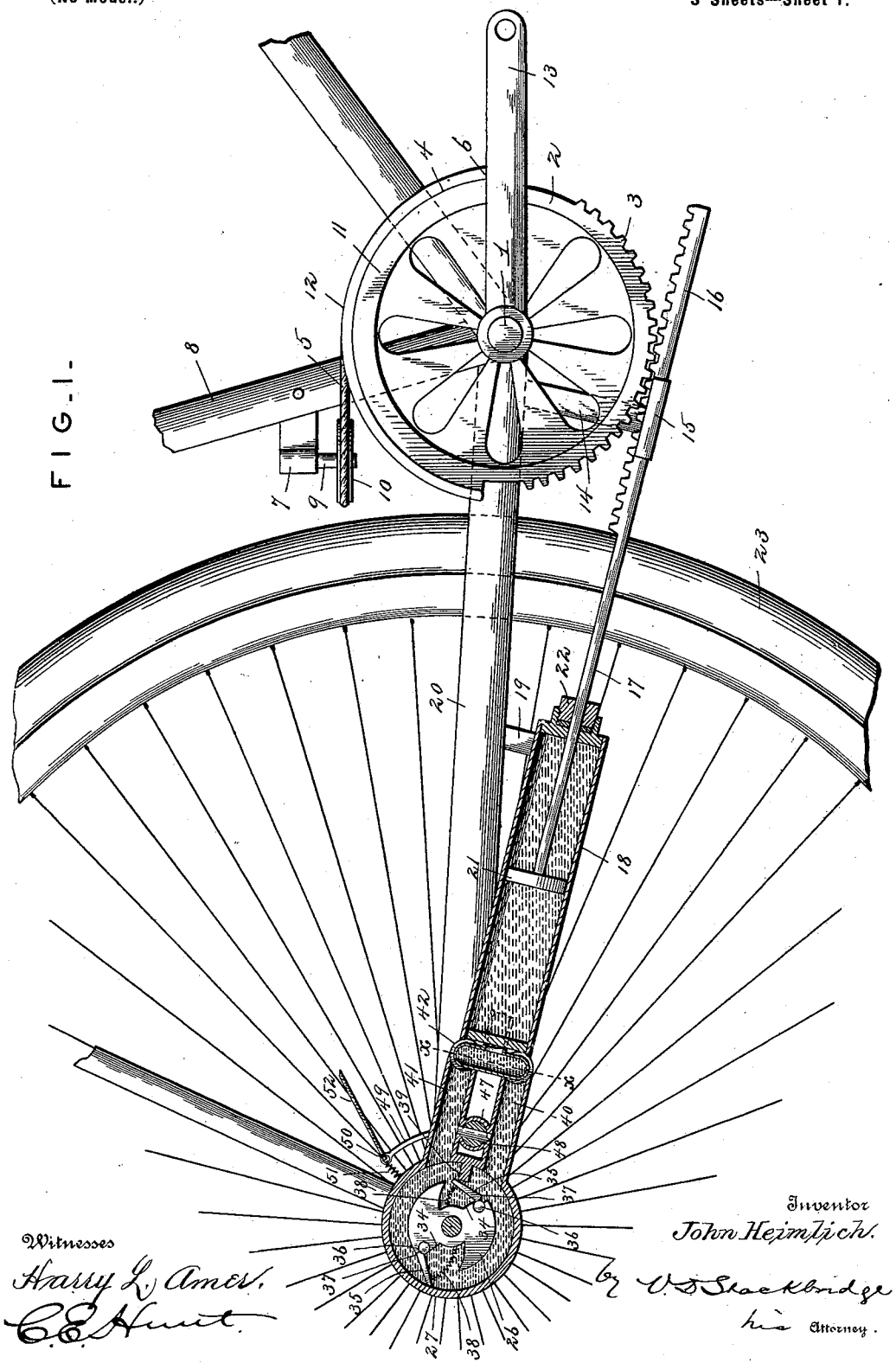

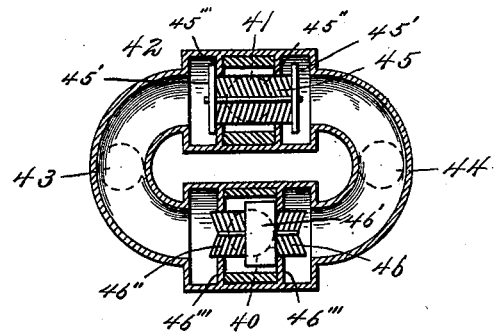
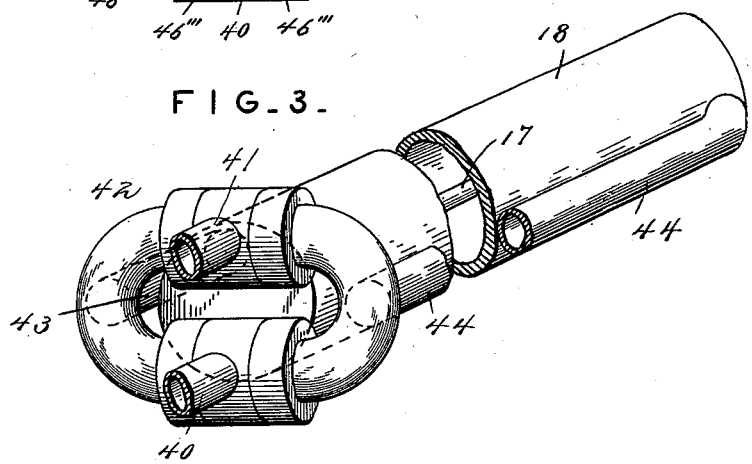
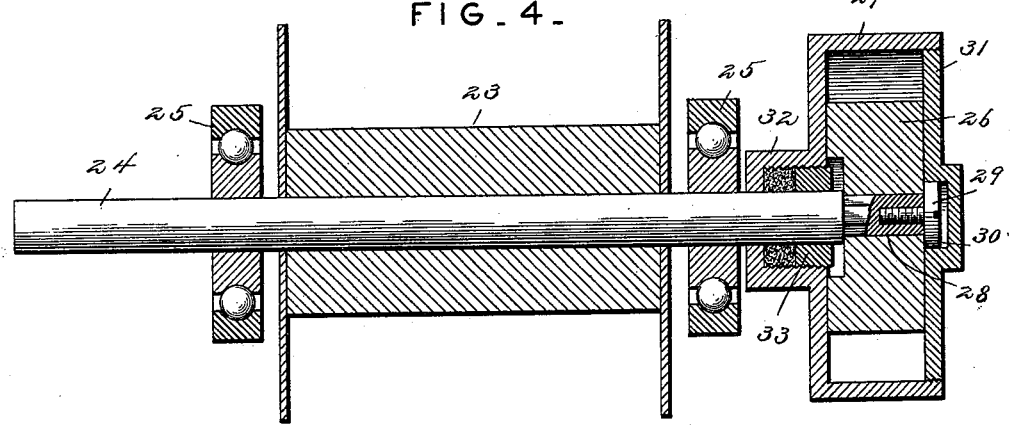

No. 621,666. Patented Mar. 21, 1899.
J. HEIMLICH.
DEVICE FOR PROPELLING BICYCLES.
(Application filed Feb. 26, 1898.)
(No Model.) 3 Sheets—Sheet 3.

Witnesses
Harry L. Amer.
C. E. Hunt.

Inventor
John Heimlich.
by O. S. Stockbridge
his Attorney.

UNITED STATES PATENT OFFICE.

JOHN HEIMLICH, OF OAK HARBOR, OHIO, ASSIGNOR OF ONE-HALF TO HARRY LILLY, OF ROCKY RIDGE, OHIO.

DEVICE FOR PROPELLING BICYCLES.

SPECIFICATION forming part of Letters Patent No. 621,666, dated March 21, 1899.

Application filed February 26, 1898. Serial No. 671,828. (No model.)

*To all whom it may concern:*

Be it known that I, JOHN HEIMLICH, a citizen of the United States, residing at Oak Harbor, in the county of Ottawa and State of Ohio, have invented certain new and useful Improvements in Devices for Propelling Bicycles; and I do hereby declare the following to be a full, clear, and exact description of the invention, such as will enable others skilled in the art to which it appertains to make and use the same.

This invention relates to bicycle driving-gear, the object in view being to dispense with the usual driving-chain and to provide a system of hydraulic driving mechanism whereby the power applied to the crank-axle may be transmitted to the axle of the driving-wheel. The system is of such nature as to admit of the parts being proportioned so as to give any desired driving power and at the same time regulate the speed of the driving-wheel axle with relation to the crank-axle. In connection with the hydraulic driving-gear means are employed by which the relative speed of the driving-wheel may be increased or diminished, the said means being within ready reach and under the immediate control of the rider while in the saddle.

The detailed objects and advantages of the invention will appear in the course of the subjoined description.

The invention consists in certain novel features, details of construction, and arrangement of parts, as hereinafter fully described, illustrated in the drawings, and incorporated in the claims hereto appended.

Figure 6:
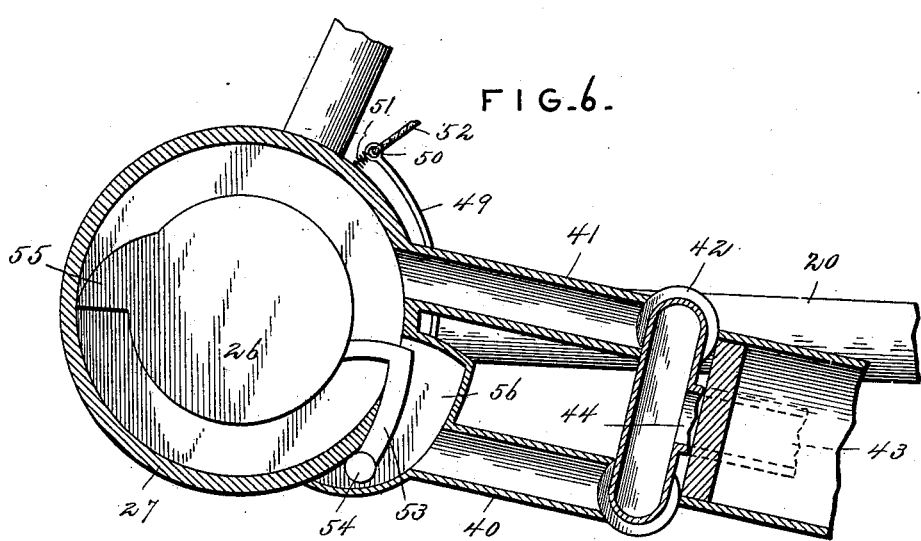
Figure 7:
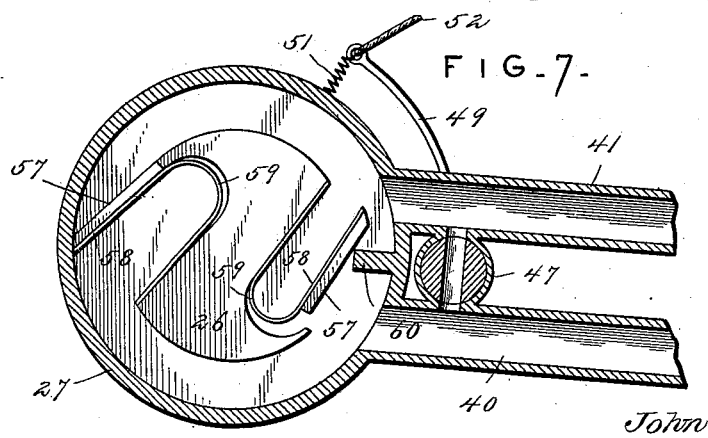

In the accompanying drawings, Figure 1 is a side elevation, partly in section, showing a sufficient portion of a bicycle to illustrate the adaptation of the improved driving-gear thereto. Fig. 2 is a transverse section taken on the line *x x* of Fig. 1. Fig. 3 is a detail perspective view showing the manner of connecting the pipes with the pump-cylinder. Fig. 4 is a sectional view through the wheel and motor-cylinder, said section being taken longitudinally of the driving-wheel axle. Fig. 5 is a detail side elevation of one of the bearings of the driving-wheel, showing also a portion of the frame. Fig. 6 is a sectional view showing a modified form of motor on the driving-wheel axle, and Fig. 7 is also a sectional view showing another modification.

Similar numerals of reference designate corresponding parts in all the views.

Referring to the drawings, it will be seen that the improved hydraulic driving mechanism is shown as applied to an ordinary safety-bicycle, this being done for the sake of convenience. It will, however, be understood as the description proceeds that the driving mechanism hereinafter described may be utilized upon any form of foot-propelled vehicle or in any place where it is desired to transmit rotary motion from one part to another part at a distant point.

In the drawings, 1 designates the crank-axle of an ordinary safety-bicycle, to one end of which is rigidly secured a wheel 2, provided along a portion of its rim with cogs 3 and along the remainder of its rim with a groove 4, in which a band or other flexible driving device 5 is adapted to lie, the said band being secured at one end 6 to the rim. Journaled in a suitable bracket 7, secured to and projecting from the seat-post 8 of the machine-frame, is a short shaft 9, upon one end of which is secured a pulley or guiding-sheave 10. The band 5 passes from the wheel 2 around the pulley or sheave 10 and is attached at its opposite end to a half-wheel or segment 11, having a grooved rim 12 to receive the band 5. The segment 11 is loose upon the axle 1 on the opposite end from the wheel 2. The axle 1 is also equipped at each end with a crank 13.

By means of the construction above described it will be seen that when one crank is depressed the wheel or segment of a wheel connected to the crank-axle operates in connection with and upon the band or flexible connection 5 to elevate the opposite crank. The cranks do not travel through a complete revolution, but oscillate up and down in advance of the crank-axle, and thus the most effective portion of the stroke is taken advantage of for propelling the machine.

14 designates a pendent bracket connected to the machine-frame adjacent to the crank-hanger and carrying at its lower end a channel or grooved guide 15, in which slides a reciprocating rack-bar 16, formed on one end of a piston-rod 17, which enters and moves within a pump-cylinder 18, attached by means of brackets 19 to one of the rear-fork blades 20 of the machine-frame. The rod 17 is provided at its rear end with a piston-head 21, and the forward end of the cylinder is equipped with a packing-gland 22 to form a water-tight joint. The driving-wheel 23 is mounted fast upon an axle 24, revolving in suitable ball-bearings 25, secured to the fork ends of the machine-frame. Fast upon the axle 24 is a revolving piston-head 26, which revolves within a cylinder or casing 27, secured to the machine-frame in any suitable manner and made stationary. The end 28 of the axle 24 is polygonal, and the piston 26 is provided with a central polygonal opening to fit over the end of the axle, so that there will be no relative rotative movement between the axle and piston. The piston is prevented from slipping off the end of the axle by means of a set-screw 29, the head of which is received in a recess 30 in a detachable cap or head 31, which fits in the outer end of the cylinder 27. The cylinder 27 is provided at its inner end with a recessed offset 32, containing a suitable packing and having a compressing-disk 33 screw-threaded therein. The disk 33 is provided in its outer face with two or more sockets to receive a spanner or wrench whereby it may be turned for compressing the packing material and forming a tight joint. The piston 26 is provided in its periphery, at opposite points, with recesses 34, in which wings or buckets 35 are adapted to fold. Each blade, wing, or bucket 35 is hinged at 36 to the piston 26 by means of a knuckle-joint employing a shoulder 37 for limiting the outward movement of said wing, the wing, however, having sufficient movement to bring its outer edge in contact with the inner surface of the cylinder 27. The wings 35 are normally held outward by means of expansive springs 38. At the front end of the cylinder is an abutment 39, by which the wings are deflected, the said abutment forming a cut-off for the liquid. After the wings pass the abutment or cut-off they are thrown outward again by their respective springs, so as to be acted upon by the liquid compressed and forced into the cylinder 27 by the action of the pump.

40 designates a supply-pipe or the pipe through which the liquid is forced from the pump to the cylinder of the motor, and 41 denotes the outlet or exhaust pipe through which the liquid passes from the cylinder 27 back to the pipe, it being the purpose of this invention to use the liquid over and over again. The pipes 40 and 41 connect at their rear ends to an elbow or loop 42. (Shown in section in Fig. 2.) The pipe 40 enters the double elbow at the lowermost point and the pipe 41 at the uppermost point. Connected to one side of one of the elbows is a pipe 43, which leads forward to the rear end of the pump-cylinder 18. Connected to the opposite elbow is a short pipe 44, which extends forward and connects with the forward end of the pump-cylinder 18. Arranged adjacent to the upper and lower points of juncture of the elbows are check-valves 45 and 46, the said valves being automatic or adapted to be shifted by the liquid according to the direction in which the liquid is moving. The valve 45 is constructed with heads 45' at each end and with wings 45'' connecting the heads and separated so as to allow the water to pass back and forth. Within the valve-chamber are located diaphragms 45''', spaced apart a distance less than the distance between the heads 45' and having openings through which the valve slides and through which the water passes back to the pump-cylinder. The valve 46 comprises a centrally-located head 46' and sets of wings 46'', extending in opposite directions therefrom through openings in diaphragms 46''' similar to those in the upper chamber. The central head 46' lies and works between the two diaphragms for allowing the liquid to pass from the pump-cylinder to the casing of the piston on the rear wheel.

From the above description it will be seen that when the piston-head 21 is thrust rearward the liquid in the rear end of the cylinder is forced through the pipe 43 into one of the elbows, where it acts to throw both valves 45 and 46 toward the other elbow, whence it passes around the lower portion of one of the elbows, past the valve 46, and enters the supply-pipe 40, passing thence to the inside of the cylinder 27 and acting upon one or both of the wings or blades 35, thus imparting rotary motion to the piston-head 26 and causing a forward rotation of the driving-wheel 23 of the machine. The liquid already contained in the cylinder 27 passes through the exhaust-pipe 41 and past the valve 45 and then passes through the remaining elbow and enters the pipe 44, whence it passes to the forward end of the pump-cylinder and enters the space in advance of the piston-head 21. When the piston-head 21 reaches the limit of its throw in a rearward direction and starts forward, the liquid in advance thereof is forced through the pipe 44, thence into the elbow with which said pipe connects, and, acting upon both valves 45 and 46, opens valve 46 and passes through the pipe 40, thus entering the cylinder 27 and acting upon the cylinder-head in the manner above described. The liquid already contained in the cylinder passes through the main pipe 41, enters the remaining elbow, passes the valve 45, enters the pipe 43, and thence passes into the pump-cylinder 18 in rear of the piston-head 21. The pump-cylinder 18 is made of sufficient size to contain several times the amount of liquid contained in the cylinder 27, so that in each reciprocation of the piston-rod 17 the piston-head 26 will be rotated two or more times. Thus by regulating the relative sizes of the pump-cylinder and motor-cylinder the relative speeds of the crank-axle and driving-wheel axle may be properly proportioned.

Adjacent to the cylinder 27 the pipes 40 and 41 are connected by a spherical casing 47, through which the liquid may escape from one pipe to another. In this cylindrical casing is arranged a valve or cock 48, provided with a stem which passes through a suitable packing-gland, the said stem having at one end a lever 49, provided at one end with an eye 50, to which is connected a spring 51, attached also to the casing or cylinder 27, so as to hold the valve 48 normally open. A cord or other flexible connection 52 is also attached to the eye 50, the said connection 52 being designed to pass forward to the handle-bar or other convenient part of the machine, where it may be reached by the rider for vibrating the lever 49 and opening or closing the valve or cock 48. The purpose of the construction just described is to allow a certain percentage of the liquid to pass directly from the supply-pipe 40 to the exhaust-pipe 41 in starting the machine when the power of the rider is not sufficient to propel the driving-wheel two or more revolutions to one of the crank-axle. When the valve 48 is open or partially open, a portion of the liquid will pass therethrough, while the remainder of the liquid will act upon the piston-head 26 and cause the rotation of the driving-wheel of the machine. As the rider attains speed the valve 48 may be allowed to close, and thereupon the full action of the liquid on the piston-head 26 may be utilized.

In Fig. 6 I have shown a modification in the form of the cut-off. In this instance the cut-off shown at 53 is movable and is of elbow form and hinged, as at 54, the end of the cut-off bearing against the piston-head 26, which is of cylindrical form and provided with a triangular or wedge shaped wing 55. The cut-off 53 is spring-pressed and normally held against the piston-head 26, but is acted upon by the inclined face of the wing 55, so as to thrust the cut-off away from the piston-head and allow said wing to pass by it, after which the cut-off moves back into contact with the periphery of the piston-head in a manner that will be readily understood. When the pivoted cut-off is employed, a suitable casing 56 is employed, into which the cut-off may fold or move when it is acted upon by the wing 55.

In Fig. 7 another modification of the piston-head and wings is shown. In this figure the wings shown at 57 are straight and disposed tangentially to the piston-head 26 and are carried by the outer straight ends 58 of a pair of U-shaped springs 59, secured at their outer ends to the head 26. These wings contact with and are thrust inward by means of a fixed abutment or cut-off 60 similar to that, 39, shown in Fig. 1.

From the foregoing description it will be seen that I have provided a simple, durable, and effective hydraulic driving-gear for bicycles and similar vehicles and that it is not necessary to have the parts tightly fitted, as a leakage of the liquid at certain times is rather an advantage, especially in starting the wheel, at which time the rider has not sufficient power to propel the driving-wheel at a speed equal to two or three times that of the crank-axle. It is for this reason that I have provided means for allowing a portion of the liquid to pass directly from the supply to the exhaust pipe without acting on the piston-head of the motor. It will also be apparent that any one of the several forms of piston-heads may be employed upon the rear or driving wheel of the machine. The preferred form, however, is shown in Fig. 1. These and other changes in the form, proportion, and minor details of construction may be resorted to without departing from the principle or sacrificing any of the advantages of the invention.

Having thus described my invention, what I claim as new, and desire to secure by Letters Patent, is—

1. In power-transmitting mechanism, a pump-cylinder, a reciprocating piston therein, a revolving piston-head, a cylindrical casing in which said head is mounted, a cut-off within said casing, a supply-pipe leading from one end of the pump-cylinder to the cylindrical casing at one side of said cut-off, an exhaust-pipe leading from the opposite side of said cut-off to the opposite end of the pump-casing, an elbow at the junction of said pipes, and check-valves within said elbow, substantially as described.

2. In power-transmitting mechanism, a pump-casing, a reciprocating piston mounted therein, means for actuating said piston, a cylindrical casing located at a distant point, a revolving piston-head therein provided with a wing, an abutment or cut-off within said cylindrical casing, a double elbow located at a point intermediate the pump and cylindrical casing, supply and exhaust pipes leading from said double elbow to the cylindrical casing and communicating therewith on opposite sides of the cut-off, pipes leading from said double elbow to opposite ends of the pump-casing, and self-actuating valves arranged within the double elbow for directing the liquid through the supply-pipe and allowing it to escape from the exhaust-pipe back to the pump-casing, substantially as described.

3. The combination with a foot-propelled vehicle, of a crank-axle, grooved segments mounted thereon, a guiding sheave or pulley journaled on the machine-frame, a flexible connection attached at its opposite ends to said segments and passing around said guiding-pulley, propelling-cranks on said axle, a piston-rod having teeth meshing with cogs on a wheel on the crank-axle, a piston-head carried by said rod, a pump-cylinder in which the piston-head reciprocates, a hydraulic motor on the driving-wheel of the machine, and tubular connections between said motor and pump, all arranged for joint operation, substantially as described.

4. The combination with a foot-propelled vehicle, of a hydraulic motor on the driving-wheel, a pump connected to the machine-frame, tubular connections between the pump and motor, a rack-bar attached to the piston-rod of the pump, a guiding-bracket for said rack-bar, a mutilated gear-wheel on the crank-axle meshing with said rack-bar and having a portion of its rim grooved, a grooved segment on the opposite end of the crank-axle, a guiding-pulley journaled on the machine-frame, and a flexible connection attached at its ends to the wheel and segment, and running around said pulley, substantially as and for the purpose described.

In testimony whereof I affix my signature in presence of two witnesses.

JOHN HEIMLICH.

Witnesses:
HARRY LILLY,
D. HEUMAN.